United States Patent [19]

Endo et al.

[11] Patent Number: 4,746,197

[45] Date of Patent: May 24, 1988

[54] DRIVING CIRCUIT FOR LIQUID CRYSTAL DISPLAY DEVICE

[75] Inventors: Shyusuke Endo, Mobara; Toshiyuki Sakuma, Ouharamachi; Toshimitsu Matsudo, Mobara; Kiyoshige Kinugawa, Mutsusawamachi, all of Japan

[73] Assignee: Hitachi, Ltd., Tokyo, Japan

[21] Appl. No.: 888,864

[22] Filed: Jul. 24, 1986

[30] Foreign Application Priority Data

Aug. 2, 1985 [JP] Japan ............................... 60-169807

[51] Int. Cl.⁴ ............................................... G02F 1/13

[52] U.S. Cl. .................................. 350/333; 350/332; 350/350 S; 340/784; 340/805; 340/811

[58] Field of Search .................... 350/332, 333, 350 S; 340/784, 805, 811

[56] References Cited

U.S. PATENT DOCUMENTS 3,995,942 12/1976 Kawakami et al. ................. 350/333

4,651,148 3/1987 Takeda et al. ....................... 340/784

4,691,200 9/1987 Stephany ............................ 340/784

FOREIGN PATENT DOCUMENTS 0143093 11/1979 Japan .................................. 350/333

*Primary Examiner*—Stanley D. Miller

*Assistant Examiner*—Huy V. Mai

*Attorney, Agent, or Firm*—Antonelli, Terry & Wands

[57] ABSTRACT

A liquid crystal display device comprises: a liquid crystal module including liquid crystal display panel having a plurality of liquid crystal picture elements arranged in a matrix form, and driving circuits for applying driving signals to signal electrodes and to scanning electrodes of the liquid crystal display panel, respectively; a control circuit for controlling operations of the liquid crystal module; and a means for inverting polarity of a voltage to be applied to a liquid crystal layer by generating a control signal M' having a period $m\tau$ which signal inverts the polarity of the voltage to be applied to the liquid crystal layer whenever a clock signal having a period $\tau$ is counted a predetermined number m/2. However, if a period of a frame frequency is $n\tau$ and an arbitrary integer is L, (1) m is set to be $2n/(2L-1)$, or (2) m is set to be n/L and the control signal M' is inverted per said frame period $n\tau$, or (3) m is set to satisfy $L-\frac{1}{2}<n/m<L$, or (4) m is set to satisfy $L-1<n/m<L-\frac{1}{2}$ and the control signal M' is inverted per the frame period $n\tau$.

Furthermore, if the least common multiple of 2n and m is H, values of m are set so that both H/(2n) and H/m are not simultaneously odd numbers.

12 Claims, 26 Drawing Sheets

DRIVING CIRCUIT FOR LIQUID CRYSTAL DISPLAY DEVICE

BACKGROUND OF THE INVENTION

The present invention relates to a liquid crystal display device and more particularly to a driving circuit for driving a liquid crystal display device.

In the case of time multiplex driving of a liquid crystal display device, the amplitude-selective addressing scheme is usually used as described in U.S. Pat. No. 3,976,362 to Kawakami and the polarity of voltage applied to liquid crystal layer is periodically reversed so that the liquid crystal layer has no mean DC level applied to it. For polarity inversion, there are two kinds of methods, one of which is to convert the driving waveforms into alternating waveforms by inverting the polarity within one frame period (the time necessary to scan all scanning lines once), and is hereafter referred to as driving method A, and the other is to convert the driving waveforms into alternating waveforms by inverting the polarity within the period of two frames and is hereafter referred to as driving method B. These methods of time multiplex driving for liquid crystal display elements are discussed in detail, for example, in the Nikkei Electronics, Aug. 18th, 1980, pp 150–174.

The time multiplex driving for liquid crystal display elements is described in the above-mentioned patent and reference, and at present the driving method B is used mainly with the increase of scanning line numbers for time multiplexing in order to avoid the increase of power consumption of a driver LSI.

However, since the lowest driving frequency in the driving method B is the half of the frame frequency, e.g. 70 Hz, there may be a case where liquid crystal display elements are driven at a very low frequency according to a pattern to be displayed. On the other hand, the threshold voltage of the liquid crystal has a characteristic dependent on the frequency of applied voltage, and in case that the threshold voltage of the liquid crystal, a voltage at which ON-state of liquid crystal display elements begins to be visible, falls largely at lower frequencies, strong blurs occur in display according to particular display patterns when the driving method B is employed. For example, if the liquid crystal has a characteristic in which the threshold voltage $V_{th}$ drops at lower frequencies as is shown in FIG. 1, and the alphabet E is displayed by applying voltage between signal electrodes $C_1, C_2, \ldots, C_{20}$ and scanning electrodes $R_1, R_2, \ldots, R_{27}$ selectively as in FIG. 2, darkening of the shaded areas of $A_1$, $A_2$ and $A_3$ occurs, and the degree of darkening is lower than that of the selected element D on $B_1$ and $B_2$ areas but higher than that of the non-selected areas E on $B_1$ and $B_2$. As a result, dark shades appear near an intended display as shadows. This phenomenon can be explained as follows. The frequency components of the driving voltage $V_o$ applied to the liquid crystal display elements on the areas of $A_1$, $A_2$ and $A_3$ are extremely lower than those of the driving voltage $V_o$ applied to the liquid crystal display elements on the areas of $B_1$ and $B_2$. Considering the frequency dependence of the threshold voltage shown in FIG. 1, the voltage $V_1$ applied to the elements on $A_1$, $A_2$ and $A_3$ areas with respect to their threshold voltages at their frequency is higher than the voltage $V_2$ applied to the elements on $B_1$ and $B_2$ areas with respect to their threshold voltages at their frequency, and as a result, the degree of darkening of the elements on $A_1$, $A_2$ and $A_3$ areas is higher than that of the non-selected elements on $B_1$ and $B_2$ areas and the phenomenon of blurs occurs around the display. As an example, the driving waveforms are shown in FIGS. 3(a) to 3(j) which are applied to the display elements $a_1$, $a_2$, $a_3$ and $a_4$ shown on FIG. 2 by the driving method B. In these figures, by comparing the driving waveforms applied to the display element $a_2$ with the driving waveforms applied to the remaining display elements $a_1$, $a_3$ and $a_4$, it can be understood that the frequency components of the driving waveforms applied to the display element $a_2$ is extremely higher than the frequency components of the driving waveforms applied to the display elements $a_1$, $a_3$ and $a_4$, and from the relationships shown in FIG. 1, it can be understood easily that the blurs in display become excessively conspicuous with the increase of frequency range of the driving waveforms. Further, in FIG. 2 the $B_1$ area appears blanched compared with $B_2$ area due to the higher frequency components for the $B_1$ area, and this phenomenon can be explained in the same way as above. Further, in FIG. 3 the symbol $\tau_D$ designates a pulse width of a scanning signal.

As a measure to solve this problem, it may be considered to use the driving method A, but it is known that a different type of blurs in display appears. By driving method A, it can be considered that the blurs are caused by considerable influences of waveform distortions on effective voltage values at resultant higher driving frequencies.

SUMMARY OF THE INVENTION

An object of the present invention is to provide a liquid crystal display device free from the blurs in display due to the lowering of the threshold voltage of the liquid crystal with low frequency.

Another object of the present invention is to provide a liquid crystal device free from spurious signals in display due to the inversion of polarity of voltage applied to liquid crystal display elements.

The above-mentioned objects can be accomplished by the present invention which provides a liquid crystal display device comprising:

a liquid crystal module including a liquid crystal display panel having a plurality of liquid crystal picture elements arranged in a matrix form, and driving circuits for applying driving signals to signal electrodes and to scanning electrodes of the liquid crystal display panel, respectively;

a control circuit for controlling the operation of the liquid crystal module; and a means for inverting the polarity of the voltage that is to be applied to a liquid crystal layer and for generating a control signal M' having a period $m\tau$ which inverts the polarity of the voltage applied to the liquid crystal layer whenever a clock signal having a period $\tau$ is counted predetermined number m/2, wherein, let the frame period be $n\tau$, and let the arbitrary integer be L, (1) m is set to be $2n/(2L-1)$, or (2) m is set to be $n/L$, and the aforementioned control signal M' is inverted per frame period $n\tau$, or (3) m is set to satisfy $L-\frac{1}{2}<n/m<L$, or (4) m is set to satisfy $(L-1)<n/m<(L-\frac{1}{2})$, and the control signal M' is inverted per frame period $n\tau$, moreover, where the least common multiple of 2n and m is H, the value of m is set so that both $H/(2n)$ and $H/m$ are not simultaneously odd numbers.

DETAILED DESCRIPTION OF THE PREFERRED EMBODIMENTS

Figure 1:
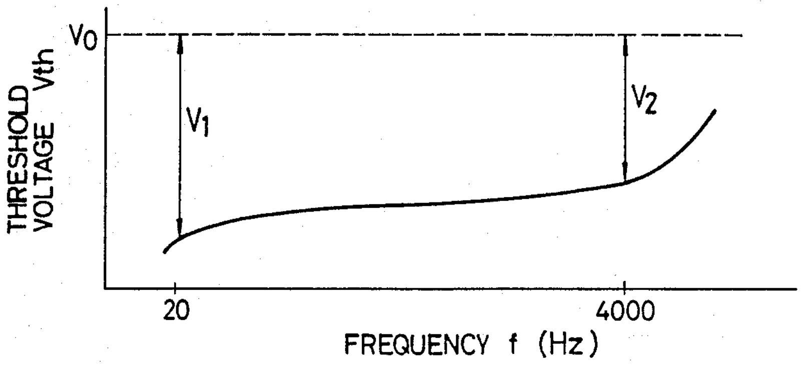
FIG. 1 shows the frequency dependence of the threshold voltage.
Figure 3:
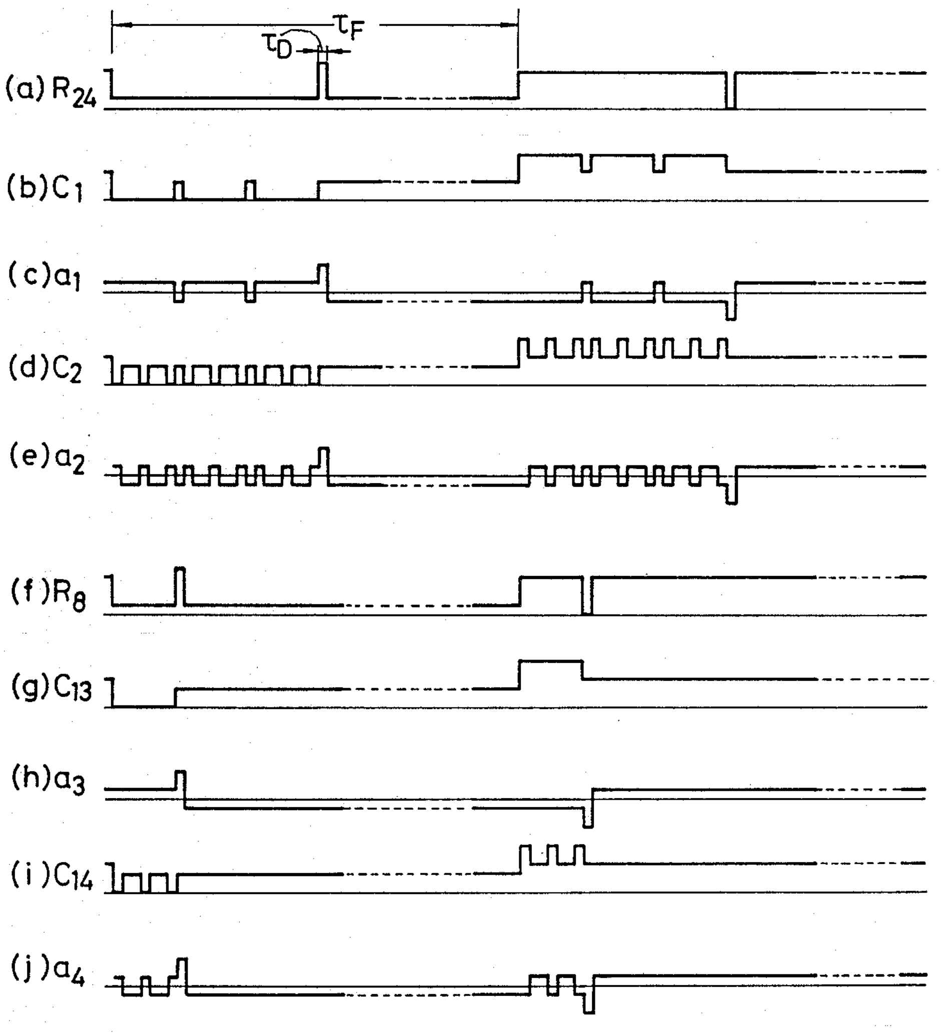
FIGS. 3(a) to 3(j) show timing charts of the operations in FIG. 2.

In the driving method B, the frequency $f_D$ of a drive voltage appiled to the liquid crystal element is in the range of relationship (1) where a frame frequency is $f_F$ and the number of scanning lines, namely the number of multiplexing is n.

$$(\tfrac{1}{2})f_F \leqq f_D \leqq (\tfrac{1}{2})nf_F \quad (1)$$

When considering an example of liquid crystal display device where a number of multiplexing is 100, since the frame frequency $f_F$ ranges from 40 to 90 Hz, the drive frequency $f_D$ is, in this case, in the range of relationship (2).

$$20\ (\text{Hz}) \leqq f_D \leqq 4500\ (\text{Hz}) \quad (2)$$

Figure 4:
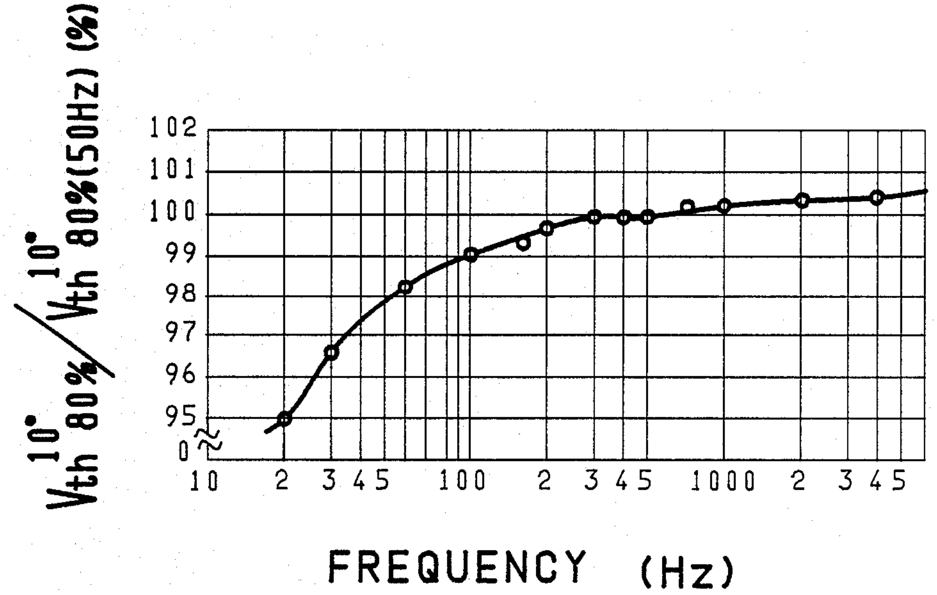
FIG. 4 is a graph showing variations in threshold voltage which are caused by the frequency.
Figure 5:
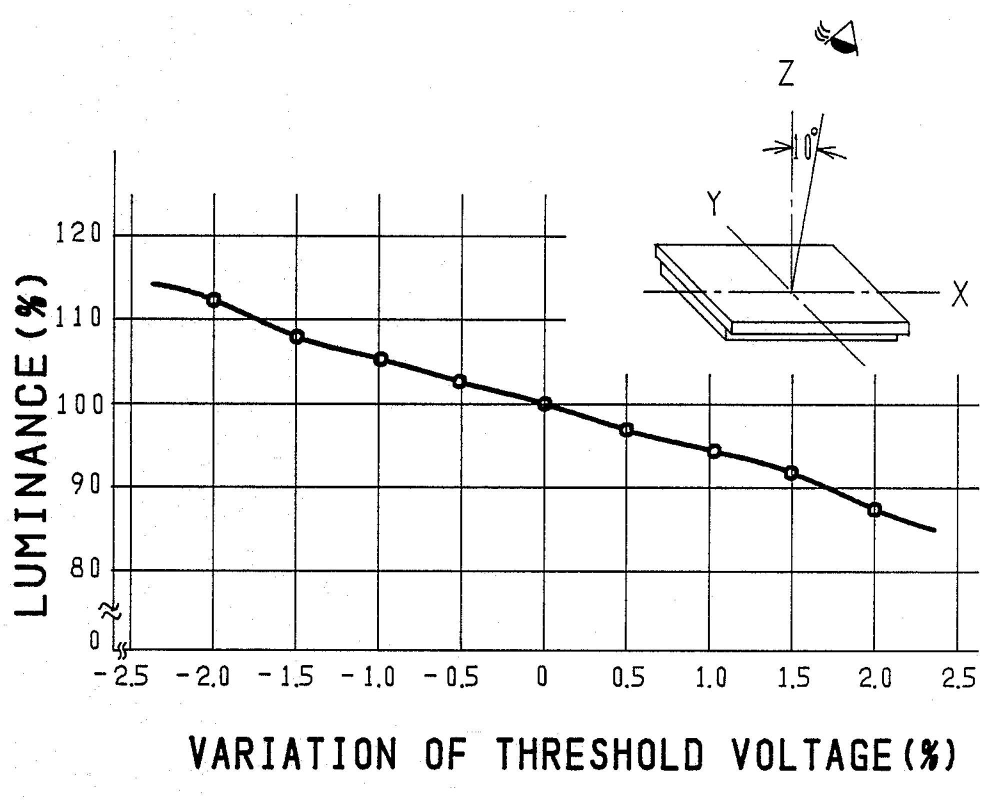
FIG. 5 is a graph showing changes in luminance versus variations in threshold voltage.

FIG. 4 shows changes in threshold voltage Vth resulting from changes in drive frequency in terms of the percentage for the threshold voaltage Vth (500 Hz) with drive frequency of 500 Hz and FIG. 5 shows changes in luminance of liquid crystal display resulting from the change of threshold voltage Vth with a fixed voltage applied across the liquid crystal layer.

Figure 6:
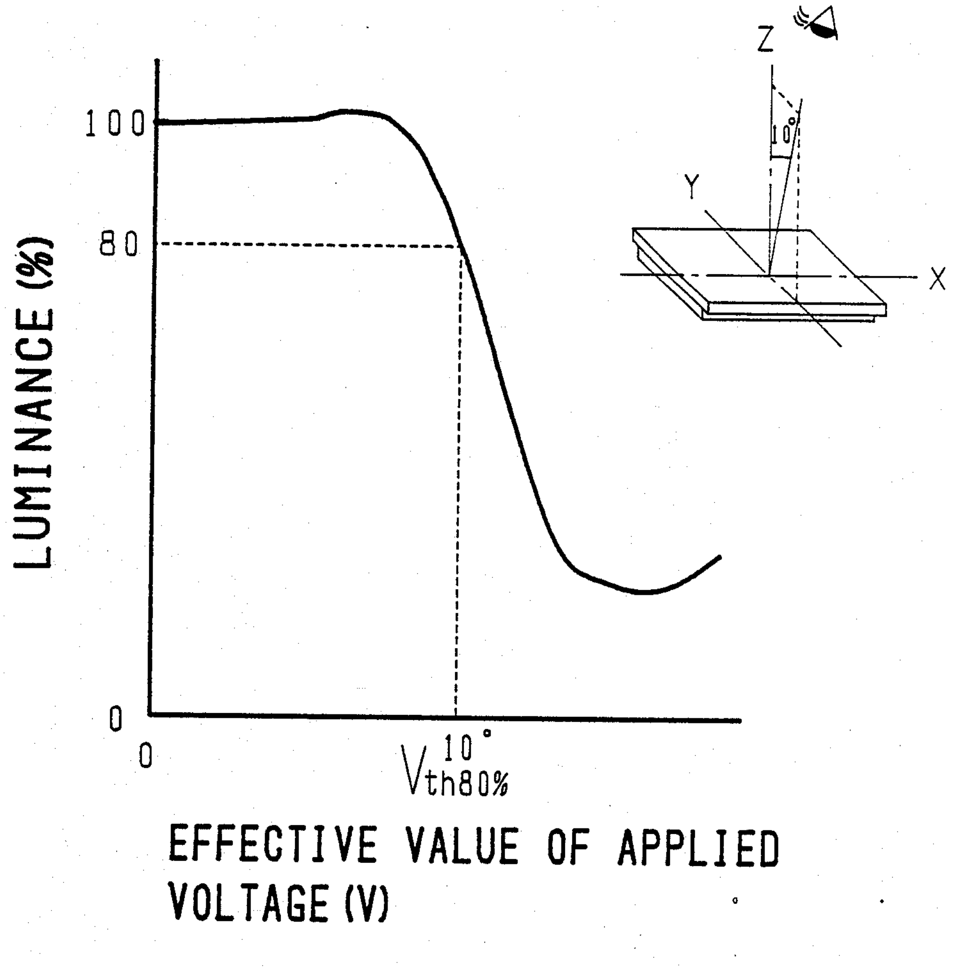
FIG. 6 is a graph showing relationship between luminance and effective values of applied voltages, this graph being employed for a description of the threshold voltage.

In these Figures, the threshold voltage Vth is, as shown in FIG. 6, the effective value of the applied voltage in which the luminance observed in the direction inclined at an angle of 10° from the normal to the display surface amounts to 80%, which is designated as $Vth_{80\%}^{10°}$.

Therefore, when the frequency $f_D$ changes in the range specified by the inequality (2), the threshold voltage Vth is lowered by 5% in the low frequency side as is apparent from FIG. 4 and thereby the luminance of liquid crystal display is changed by 10% or more with reference to FIG. 5, allowing generation of blur in display. It can also be understood that the change of threshold voltage Vth must be suppressed to about 1.5% or less in view of keeping change of luminance at 10% or less so that blur in display can not be detected, but the minimum value of drive frequency must be kept at 100 Hz or more in order to suppress changes in threshold voltage Vth to 1% or less considering some margin.

Figure 7:
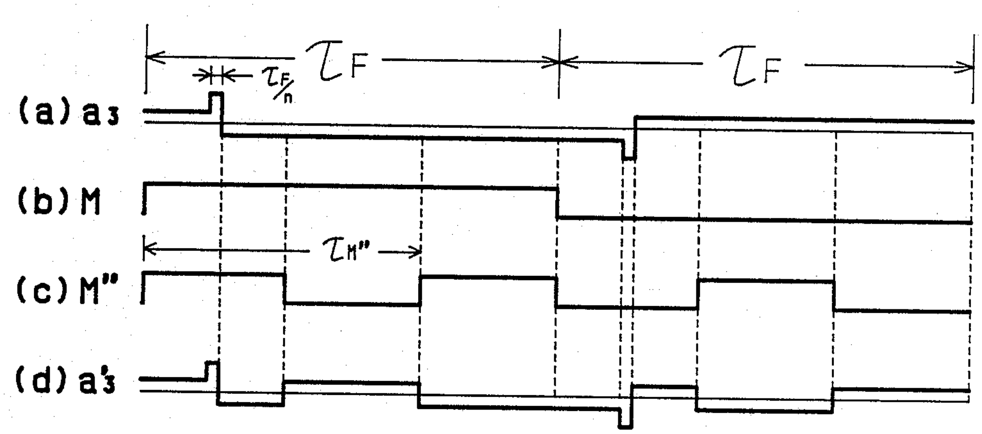
FIGS. 7(a) to 7(d) inclusive are charts for describing a method of increasing frequencies of the driving voltage with the help of a new control signal M"

In order to raise the minimum value of drive voltage frequency component without changing the voltage waveforms applied to the signal electrodes Ci and scanning electrodes Ri from that of the driving method B, the period for reversal of polarity of voltage applied to the liquid crystal element must be set larger than that of the driving method A but must be smaller than that of the driving method B. An example of drive signal waveform applied to the picture element $a_3$ shown in FIG. 2 will be explained hereinafter. In FIG. 7, the waveform (a) is a drive waveform applied to the picture element $a_3$ during the drive by the driving method B, the waveform (b) is a control signal M for reversing the polarity of voltage applied to liquid crystal layer during the driving method B, namely during the two frame period, the waveform (c) is a new control signal M" for increasing frequencies of drive waveform applied to the liquid crystal layer, and the waveform (d) is a drive waveform formed through inversion of polarity by the new control signal M". Since the frequency of new control signal M" is equal to triple that of control signal M for the driving method B, the frequency component of drive waveform applied to the picture element $a_3$ is also tripled.

The minimum frequency component, 20 Hz of the drive voltage in the driving method B can be set higher than the minimum driviang frequency 100 Hz for suppressing the change in Vth to 1% or less by inverting the polarity of the drive voltage with the control signal having the period less than 1/5 of that of the control signal M whose period is double the frame period in the driving method B. Meanwhile, if the period of control signal is set excessively short, the driving method becomes similar to the method A and influences by the distortion of drive waveform on the effective value of drive voltage become large, and blurs in display are generated.

According to the results of some experiments, it is found that that when the frame frequency falls within a range of 40–90 Hz and the number of multiplexing n is in a range of 50–200, it is preferable to adopt the new control signal M'' which satisfies the relation indicated below.

$$2.0 \leqq (\text{Frame period}/\text{Period of the new control signal}) \leqq 6.0 \quad (3)$$

The embodiments of the present invention will then be explained in detail with reference to the accompanying drawings.

Figure 8:
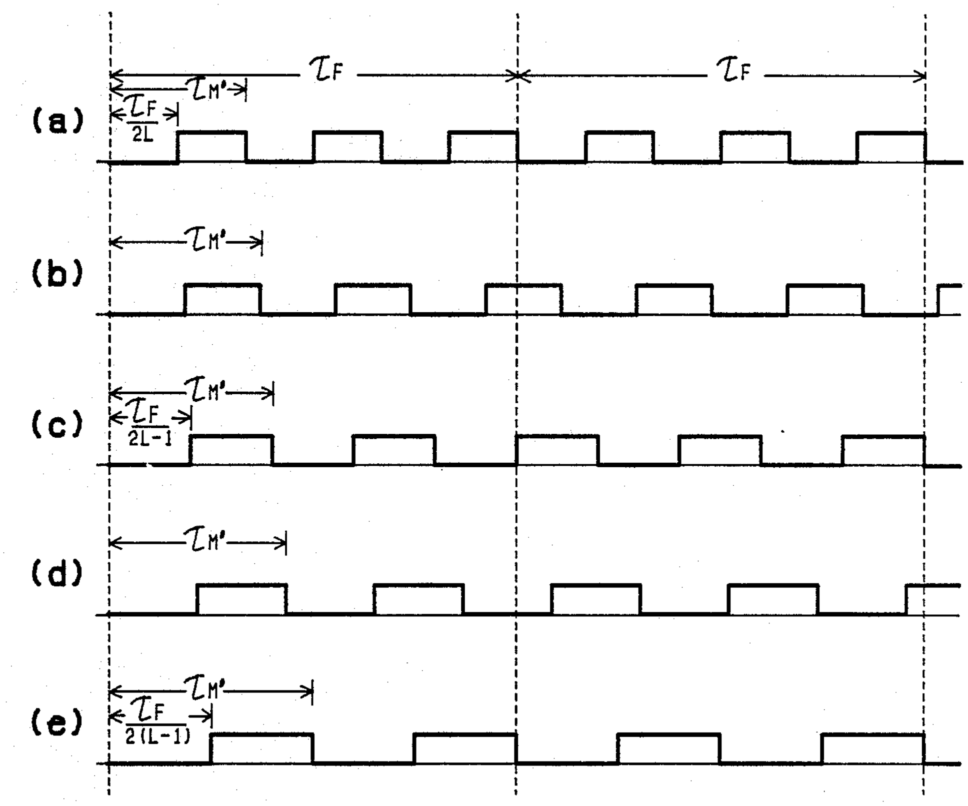
FIGS. 8(a) to 8(e) inclusive are charts for explaining phasic relationships between successive frames and a ratio of the period of the control signal M' to the frame period.

Referring to FIG. 8, there are shown phasic relationships between a ratio of the frame period $\tau_F$ the period $\tau_{M'}$ of the control signal M' and starting ends of successive frames.

$$\text{When } L-1 \leqq \tau_F/\tau_{M'} < L-\tfrac{1}{2} \quad (4)$$

where L is an integer, the polarity of the control signal M' at the starting ends of the successive frames, as shown in FIG. 8(a), 8(d), 8(e), does not change.

$$\text{When } L-\tfrac{1}{2} \leqq \tau_F/\tau_{M'} < L \quad (5)$$

as shown in FIGS. 8(b), 8(c), the polarity of the control signal M' at the starting ends of the successive frames is inverted.

Hence, given that $\tau_{M'}$ is set to a relationship such as $L-1 \leqq \tau_F/\tau_{M'} < L-\tfrac{1}{2}$, it is desirable to invert the control signal M' with the frame period $\tau_F$.

Save for the method A, even-numbered frames are required for making the mean value of the voltage zero which is to be applied to the liquid crystal layer. Where $\tau$ is the clock period; n$\tau$ is the frame period; and m$\tau$ is the period of the control signal M', the period $\tau_{ALT}$ with which the phasic relationship between the frame frequency and the control signal M' is likewise repeated as in the case of the initial relationship is given such as:

$$H = \tau_{ALT}/\tau = (\text{the least common multiple of 2n and m}) \quad (6)$$

Figure 9:
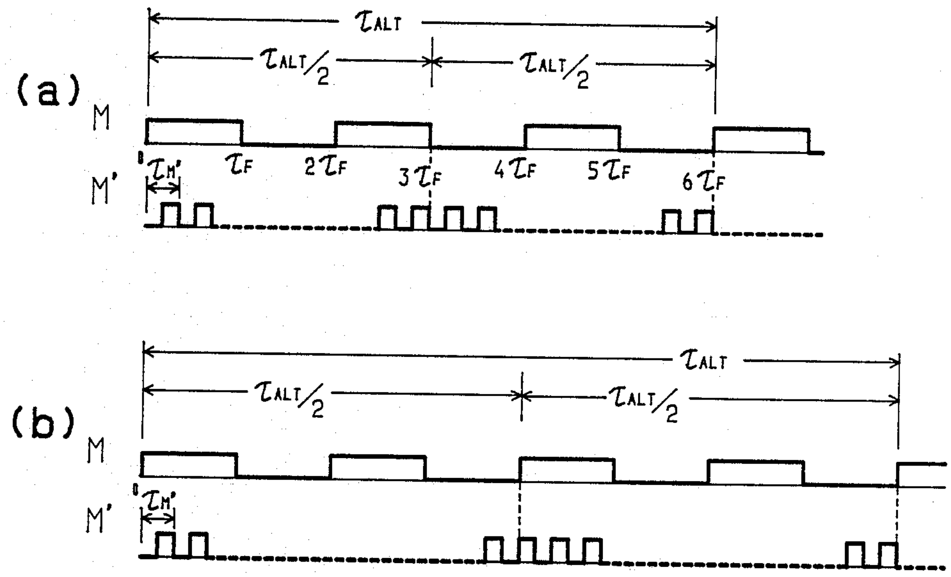
FIGS. 9(a), 9(b) are charts for describing a phasic relationship between the control signals M and M'.

FIG. 9 shows a phasic relationship between the control signal M and the control signal M' in connection with the period $\tau_{ALT}$, the control signal M' being generated by counting the clock signal and the control signal M being the signal for polarity reversal with the frame period $\tau_F$.

FIG. 9(a) shows such a phasic relationship required for making the mean value of the voltage which is to be applied to the liquid crystal layer per period $\tau_{ALT}$ zero, when $\tau_{ALT} = 2(2K+1)\tau_F$, k being an integer. Hence, the following formulae must be satisfied.

$$\tau_{ALT}/\tau_M = \tau_{ALT}/(2n\tau) = H/(2n) = \text{odd numbers},$$

$$\tau_{ALT}/\tau_{M'} = \tau_{ALT}/(m\tau) = H/m = \text{even numbers} \quad (7)$$

When $\tau_{ALT} = 2.2K.\tau_F$, FIG. 9(b) shows such a phasic relationship required for making the mean value of the voltage which is to be applied to the liquid crystal layer per period $\tau_{ALT}$ zero. This indicates that the formulae (8) must be met.

$$\tau_{ALT}/\tau_M = \tau_{ALT}/(2n\tau) = \text{even numbers},$$

$$\tau_{ALT}/\tau_{M'}/(m\tau) = \text{odd numbers} \quad (8)$$

In other words, the value of m is set so that both H/(2n) and H/m are not simultaneously odd numbers.

If the P is a positive integer, the equation (9) can be expressed as follows.

$$n = mP + Q \quad \text{however, } m > |Q| \quad (9)$$

Accordingly, as Q decreases, the scanning line on which the polarity inversion takes place moves more smoothly. To be specific, if m is so set as to establish this inequality, $-10 \leqq Q \leqq 10$, the scanning line on which the polarity inversion of the voltage applied to the liquid crystal layer occurs moves smoothly, thereby preventing deterioration of the display quality.

The preferred embodiments of the present invention will hereinafter be described in detail with reference to the accompanying drawings.

Figure 10:
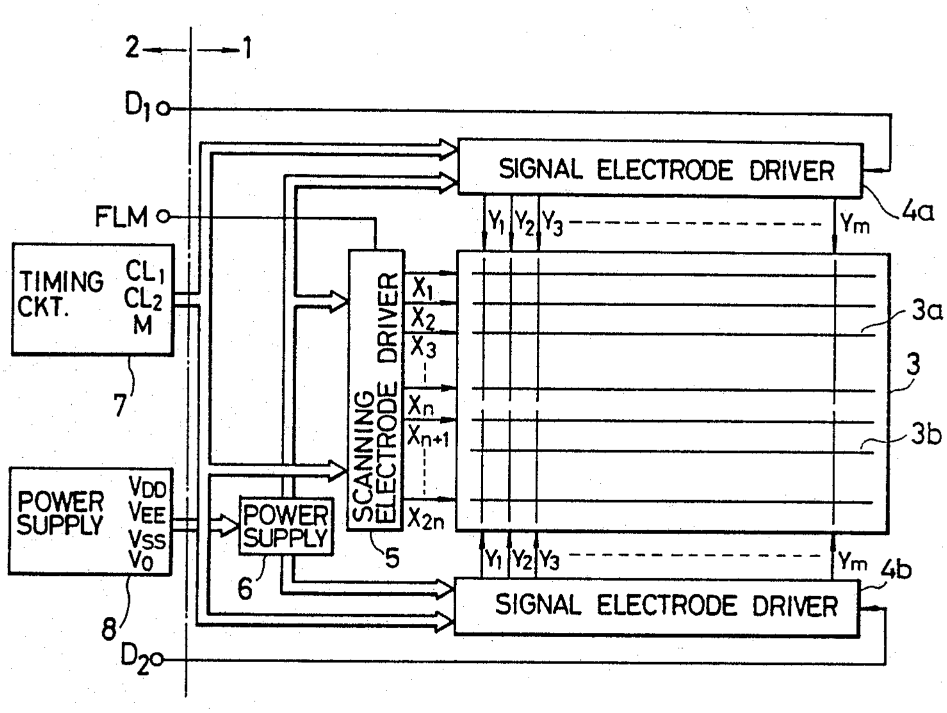
FIG. 10 is a block diagram of liquid crystal modules which shows one example of a driving circuit designed for a liquid crystal display device according to the present invention.
Figure 11:
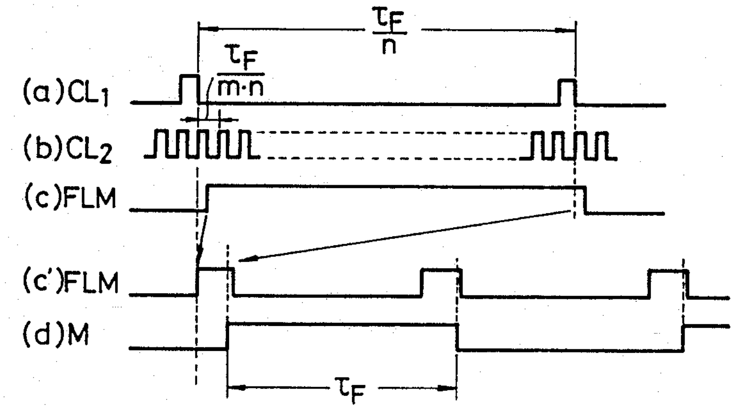
FIGS. 11(a) to 11(d) inclusive are charts showing operational timing of FIG. 10.

FIG. 10 is a block diagram showing one example of the liquid crystal display device comprising a liquid crystal module and a control circuit for controlling this liquid crystal module.

In this Figure, reference numeral 1 denotes a liquid crystal module comprising a liquid crystal display panel having a plurality of liquid crystal picture elements arranged on a matrix and driving circuits for the liquid crystal, and 2 denotes a control circuit (for example, Control Circuit Board for Graphic LCD display Modules CB 1026R available from Hitachi, Ltd.) for controlling the operation of the liquid crystal module 1. Numeral 3 denotes the liquid crystal display panel shown in FIG. 2, 4*a* and 4*b* signal electrode driving circuits for giving signal voltage as its outputs to the Y axis signal lines $Y_1, Y_2, Y_3, \ldots, Y_m$ of the liquid crystal display panel blocks 3*a* and 3*b*, respectively, and 5 a scanning electrode driving circuit for giving selective pulses as its outputs for scanning the X axis scanning lines $X_1, X_2, X_3, \ldots, X_n$ and $X_{n+1'} X_{n+2'} \ldots, X_{2n}$ of the liquid crystal panel blocks 3*a* and 3*b* respectively and sequentially. Numeral 6 denotes a power supply for supplying proper voltage to drive the signal electrode driving circuits 4*a*, 4*b* and the scanning electrode driving circuit 5 by the amplitude-selective addressing scheme as described in U.S. Pat. No. 3,976,362 to Kawakami. The numeral 7 denotes a timing circuit for generating the latch signal $CL_1$, data shift signal $CL_2$ and the control signal M for AC driving as the timing signals to operate the liquid crystal module 1, and 8 a power supply for supplying the proper voltage to the power supply 6. Symbols $D_1$ and $D_2$ denote data terminals to which ON-OFF information for all picture elements on the signal electrodes $Y_1, Y_2, Y_3, \ldots, Y_m$ are given serially as the inputs and FLM an input terminal to which the frame frequency signal is given as its input. Further explanation is made in "Liquid-Crystal Matrix Display", Image Pickup and Displays, IV Academic Press (1981).

FIGS. 11(a) to 11(d) are timing charts showing the output signals of the control circuit 2 shown in FIG. 10 by the driving method B.

In this configuration, ON-OFF information signals for all picture elements on a certain scanning line are given to the data terminals $D_1$ and $D_2$ serially as inputs. The shift register in the signal electrode driving circuits 4*a* and 4*b* shifts the data according to the data shift signal $CL_2$. A latch signal $CL_1$ is outputted when the shift register is filled by the serial data and is latched by a latch circuit. By switching an analog multiplexer according to the latched data and taking out the pulse signals for either selecting or non-selecting elements, desired picture elements can be displayed. In this case, the latch signal $CL_1$ generates signals at every interval which equals the divided value of the frame period $\tau_F$ by n, which is the number of time multiplexed scanning lines, and latches the data. Also, in the driving method B, as has been mentioned above, the driving waveforms for the liquid crystal are converted into alternating waveforms by inverting the polarity within two frames and the complete alternating waveforms within the two frames can be obtained by the control signal M having a period which is twice the frame period $\tau_F$. By using such a driving method, when all elements are displayed (ON) or all elements are not displayed (OFF), the frequency of the driving waveforms applied to the liquid crystal equal to about the half of the frame frequency $f_F=1/\tau_F$. Like this, in the driving method B, the lowest frequency component is low and this causes the blurs in display.

The present invention is therefore characterized such that the new control signal M" having a period shorter than that of the original control signal M based on the above-described driving method B is generated in place of the control signal M; and the liquid crystal driving waveforms are inverted in polarity for alternation by employing the new control signal M", thereby driving the liquid crystal display device.

Embodiment 1

When the time-multiplexing number n is 64 and the frame frequency $f_F$ is 70 Hz, there is exemplified a plan wherein the minimum driving frequency $f_{Dmin}$ that is to be applied to the liquid crystal layer exceeds 200 Hz. Especially, the following three points are taken into consideration: firstly, Q of the expression (9) should be as small as possible; secondly, H of the formula (6) should be minimized; and finally, the number of the driving circuits to be constituted should be reduced down to the minimum thereof.

In case of effecting no alternation, the minimum driving frequecy to be applied to the liquid crystal layer is 70 Hz. In order to increase this frequency up to 200 Hz, the frequency $f_{M'}$ of the cocntrol signal M' is given as follows:

$$f_{M'} \geqq f_F \times (200\ \mathrm{Hz/Hz})$$

Accordingly, $\tau_F/\tau_{M'}=n/m \geqq 200/70=2.86$

If the phasic relationship described in the previous expression (4) is chosen, the values of m which satisfies this inequality, $3.0<64/m<3.5$, are 19, 20 and 21.

The least common multiple H of $2n=128$, $m=19$ amounts to 24321, so that $H/(2n)=2432/128=19$, $H/m=2432/19=128$.

The least common multiple H of $2n=128$, $m=20$ is 640, and hence $H/(2n)=640/128=5$, $H/m=640/20=32$.

Furthermore, the least common multiple H of $2n=128$, $m=21$ amounts to 2688, and therefore $H/(2n)=2688/128=21$, $H/m=2688/21=128$. The relationship of the formula (6) can be satisfied in any case.

When computing Q of the above-described expression (9), such combinations as ($m=19$, $Q=7$), ($m=20$, $Q=4$), ($m=21$, $Q=1$) are given.

So far as this embodiment is concerned, there is chosen $m=20$ in which H becomes its minimum.

Figure 12:
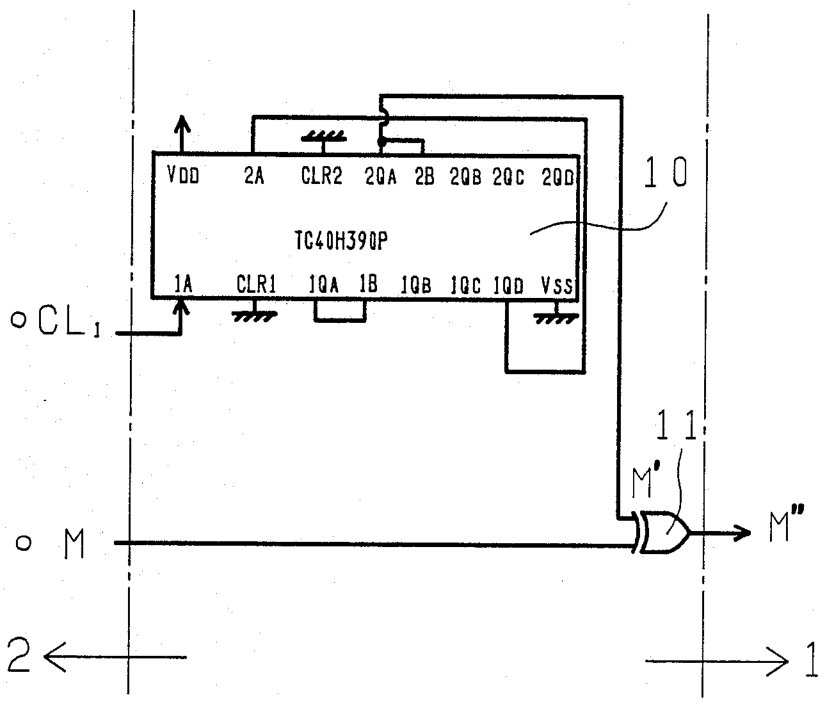
FIG. 12 is a circuit diagram showing one example of the liquid crystal driving circuit connected to that depicted in FIG. 10.

In the second place, a circuit is tangibly exemplified. In FIG. 12, between a liquid crystal module 1 and a controller circuit 2 are provided a counter circuit 10 for outputting the new control signal M' by counting the latch signal $CL_1$, and an Exclusive-OR circuit 11 for outputting a still newer control signal M" by utilizing both the control signal M' and the original control signal M based on the driving method B which is outputted from the controller circuit 2. According to this embodiment, ten $CL_1$ pulses are counted, and the $CL_1$ is frequency-divided, thereby obtaining the new control signal M'. The still newer control signal M" is the output signal procured by a step wherein the counter output M' and the control signal M based on the driving method B that is outputted from the controller circuit 2 are exclusive-ORed.

In this embodiment shown in FIG. 12, inasmuch as reset signal terminals CLR1, CLR2 of the counter circuit 10 are grounded, the counter circuit 10 counts the latch signal $CL_1$ and outputs the control signal M' regardless of a frame signal FLM which will be mentioned in the embodiment 2. Therefore, neither the new control signal M' nor the still newer control signal M" generated on the basis of the signal M' synchronizes with the frame signal FLM. Namely, they do not synchronize with the change-over of frames, but the control signal M" is inverted. FIGS. 13(a) to 13(e) in combination show the timing of each of the signals $CL_1$, FLM, M, M', M" which are employed in this embodiment. The still newer control signal M" does not synchronizes with the frame signal FLM and hence the scanning line on which the inversion of polarity of the voltage to be applied to the liquid crystal is started moves per frame. In the Figure, an aspect of the movement is depicted by an arrowhead.

Embodiment 2

Figure 14:
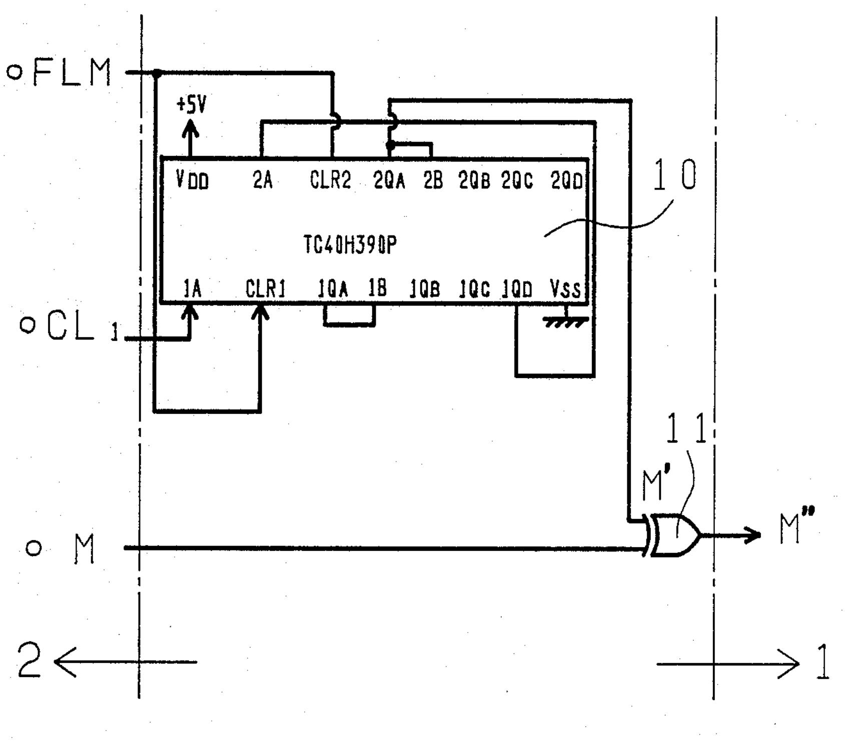
FIG. 14 is a circuit diagram showing another example of the liquid crystal driving circuit connected to that depicted in FIG. 10.
Figure 15:
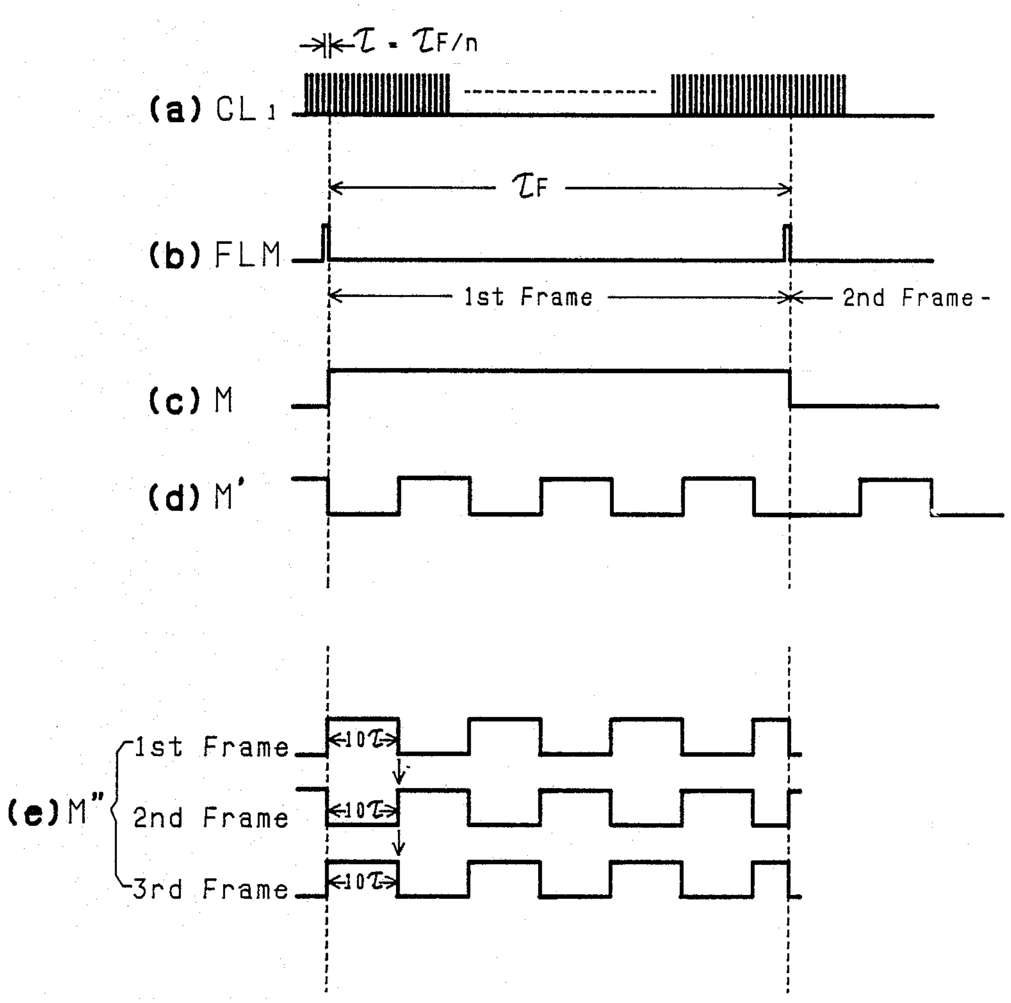
FIGS. 15(a) to 15(e) inclusive are charts showing operational timing of the circuit of FIG. 14.
Figure 16:
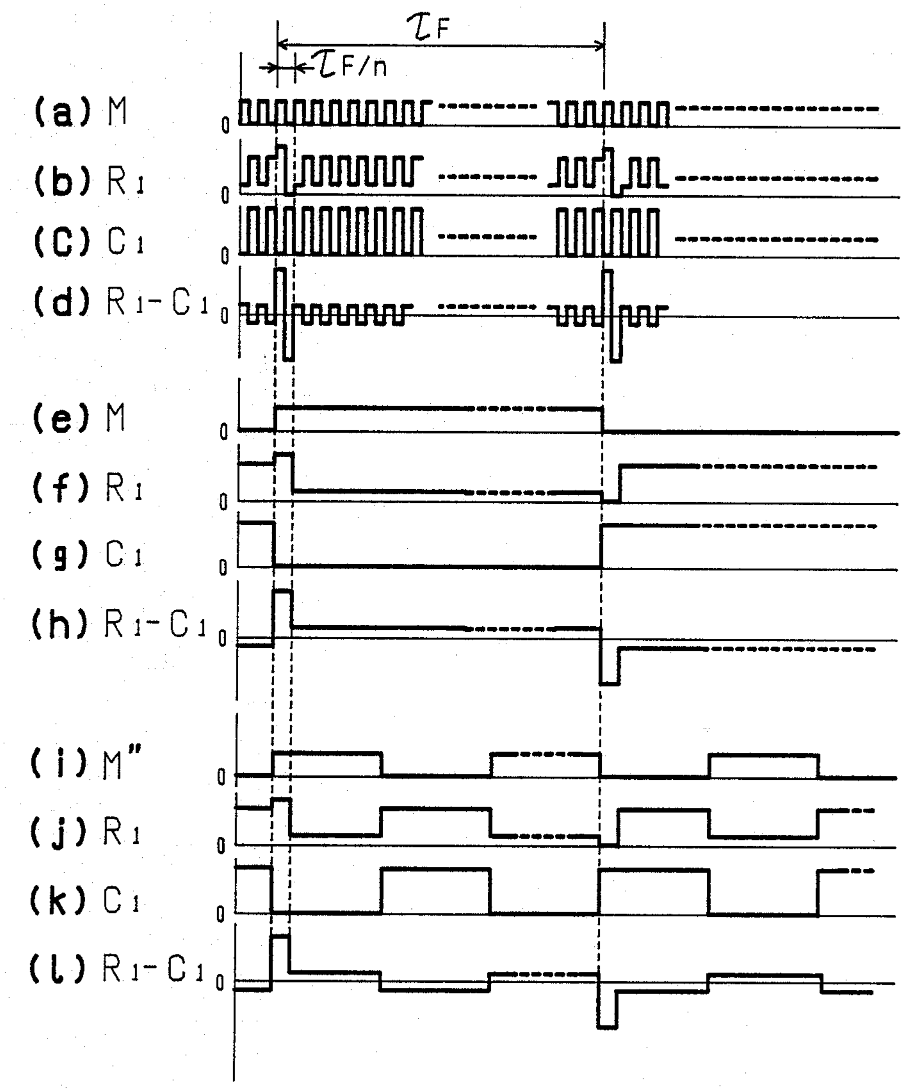
FIGS 16(a) to 16(l) inclusive are charts of voltage waveforms which show comparison of driving frequencies by the driving methods A, B and the embodiment 1, respectively, when all the picture elements are to be in an ON-state.

The embodiment 2 involves the same step as that of the embodiment 1 wherein: the time-multiplexing number n is 64; the frame frequency $f_F$ is 70 Hz; the minimum driving frequency $f_{Dmin}$ exceeds 200 Hz; and ten $CL_1$ pulses are counted thereby to generate the new control signal M'. In the embodiment 2, however, as shown in FIG. 14, the frame signal FLM is inputted to the reset signal terminals CLR1, CLR2 of the counter circuit 10, so that the counter circuit 10 synchronizes with the frame signal FLM every time that the same signal is inputted. Thereafter, the counter circuit 10 is reset so as to start counting the latch signal $CL_1$, whereby the new control signal M' is outputted.

Figure 13:
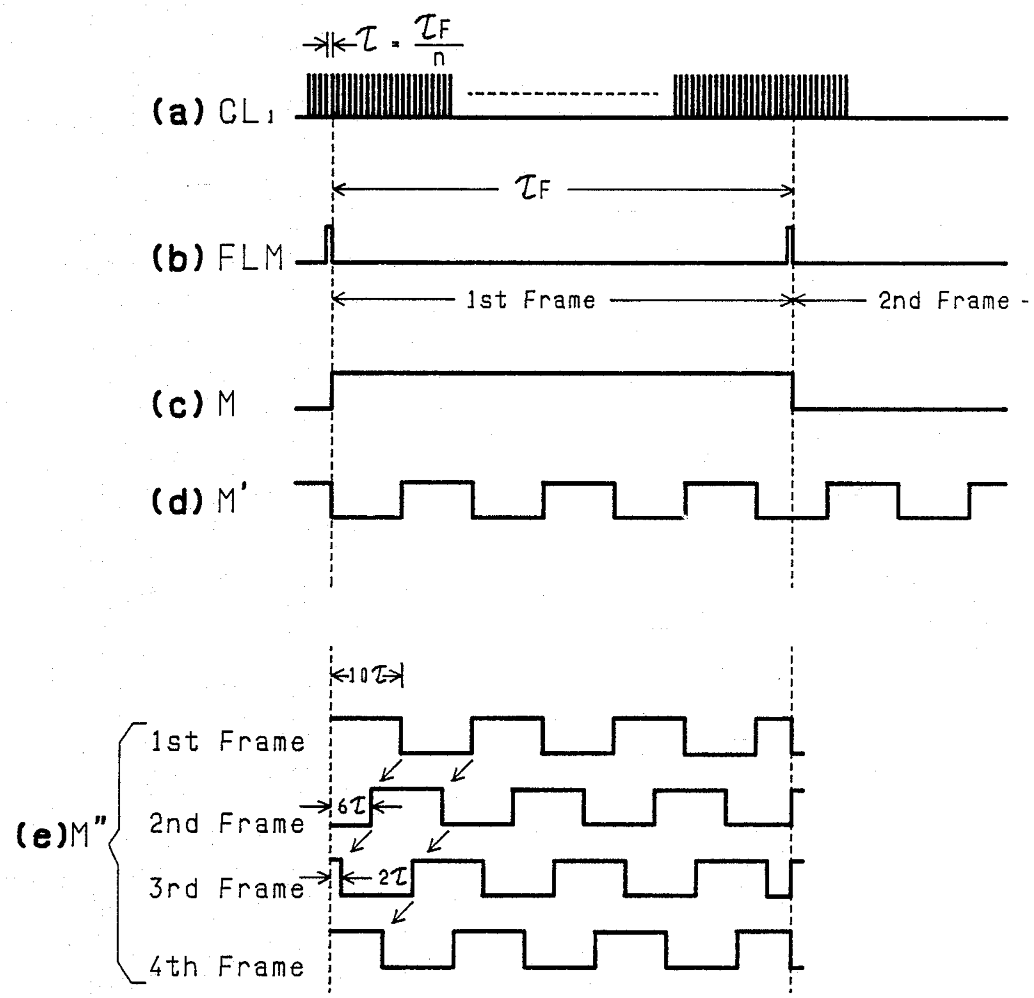
FIGS. 13(a) to 13(e) inclusive are charts showing operational timing of the circuit illustrated in FIG. 12.

Since this control signal M' synchronizes with the frame signal FLM, the still newer control signal M" generated on the basis of the signal M' likewise synchronizes therewith. In other words, this signal synchronizes with the change-over of the frame. FIGS. 15(a) to 15(e) respectively show the timing of each of the signals employed in the embodiment 2. In this case, the still newer control signal M" synchronizes with the frame frequency signal FLM and hence the scanning line on which the inversion of polarity of the voltage to be applied to the liquid crystal is started is fixed without moving per frame. FIG. 13 shows this situation with the help of an arrowhead. As can be clarified from the description so far made in this embodiment, where the scanning line on which the inversion of polarity of the voltage to be applied to the liquid crystal occurs is fixed with respect to all the frames, unevenness of display may be created depending on the operational conditions on the scanning line on which the inversion of polarity takes place. Under such circumstances, if the control signal M" is rendered asynchronous with the frame signal FLM as in the case of the embodiment 1, it is feasible to eliminate such display-unevenness.

In the aforementioned embodiments of the present invention, the minimum driving fequency can be set to a higher value than that in the conventional driving method B; and it is practicable to improve the display-unevenness that is caused by a decrease in threshold voltage Vth of the liquid crystal on the side of low frequencies.

Figure 2:
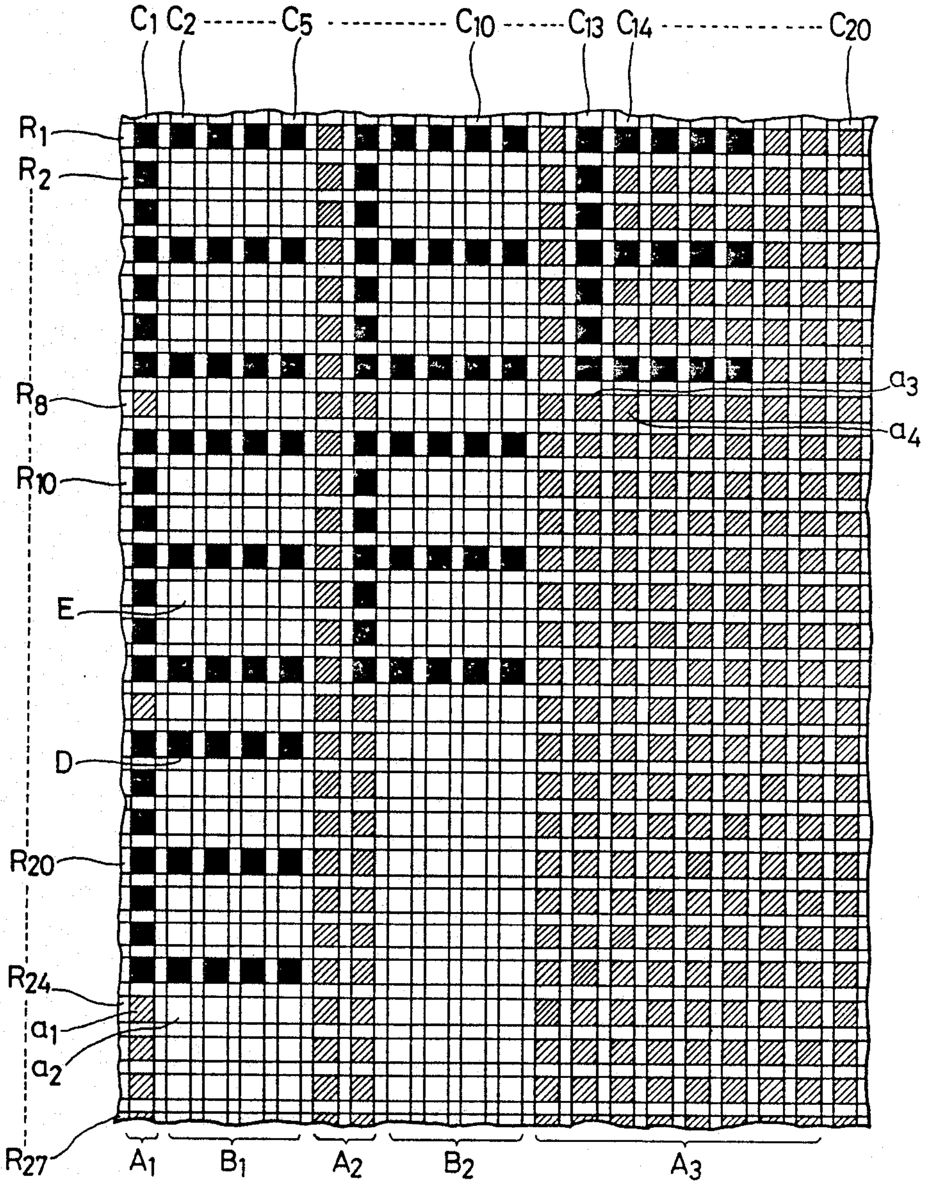
FIG. 2 is a diagram for illustrating the occurrence of blurs in display in the case of displaying the pattern of the alphabet E on the liquid crystal panel.

FIGS. 16(a) to 16(l) in combination show the respective driving waveforms of the voltage $R_1$ on the scanning electrode and the signal voltage $C_1$ in case of the all dot-lighting of the liquid crystal panel shown in FIG. 2 by making a comparison between the driving method A, the driving method B and the driving method of the embodiment 1. FIGS. 16(a) to 16(d) show the driving waveforms when the driving method A is employed; FIGS. 16(e) to 16(h) show the driving waveforms when the driving method B is used; and FIGS. 16(i) to 16(l) show the driving waveforms when the driving method of the embodiment 1 is utilized. It becomes apparent on observing the Figures that the driving frequency can be set to a vlaue lower than that of the driving method A, while at the same time it can be set to a value higher than that of the driving method B. Hence, it is feasible to improve the above-described unevenness of display.

The driving circuits depicted in FIGS. 12 and 14 according to the present invention are simply constituted such that two pieces of CMOS LSI's are merely added to a conventional circuit. Such a constitution inevitably brings about no large increase in manufacturing costs. When viewing this driving circuit as a black box from the outside, the configuration is the same as that of the conventional one, and compatibility of the system is favorable.

Embodiment 3

Where the time-multiplexing number n=80 and the frame frequency $f_F$=70 Hz, m is likewise computed as in the case of the embodiment 1 thereby to obtain m=23, 24, 25, 26. However, m=26 which allows Q to become its minimum is adopted.

Figure 17:
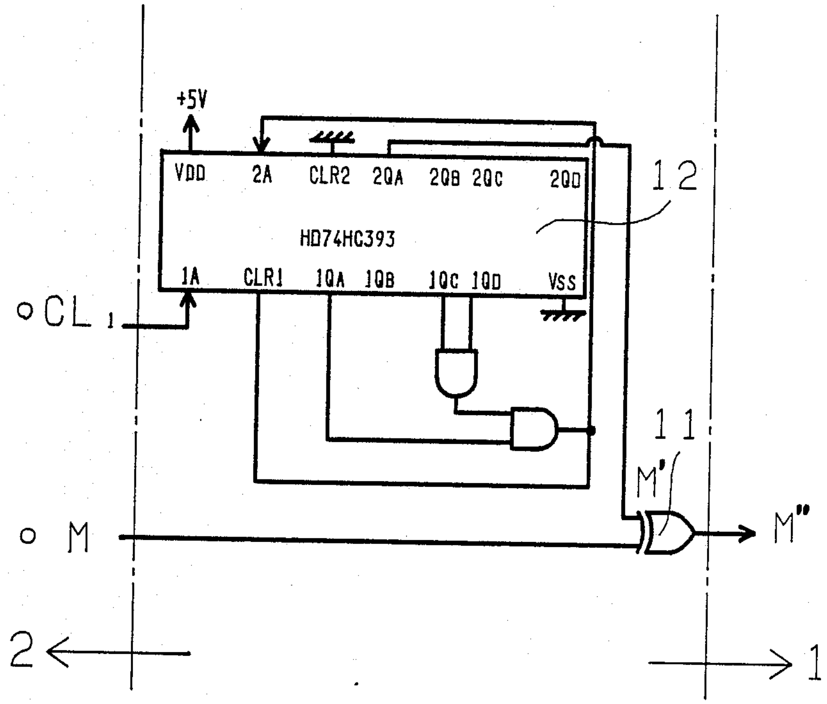
FIGS. 17 to 28 inclusive are circuit diagrams each showing a still another embodiment of the liquid crystal driving circuit connected to that of FIG. 10.

Referring to FIG. 17, there is a shown a tangible circuit consisting of a binary counter 12 and an Ex-OR circuit 11. A particular difference between this circuit and the circuit employed in the embodiment 1 involves such a point that an AND gate is utilized with a view to acquiring m=26 in the embodiment 3. In this embodiment, the still newer control signal M" does not synchronize with the frame signal FLM. This is the same with the embodiment 1.

Embodiment 4

Figure 18:
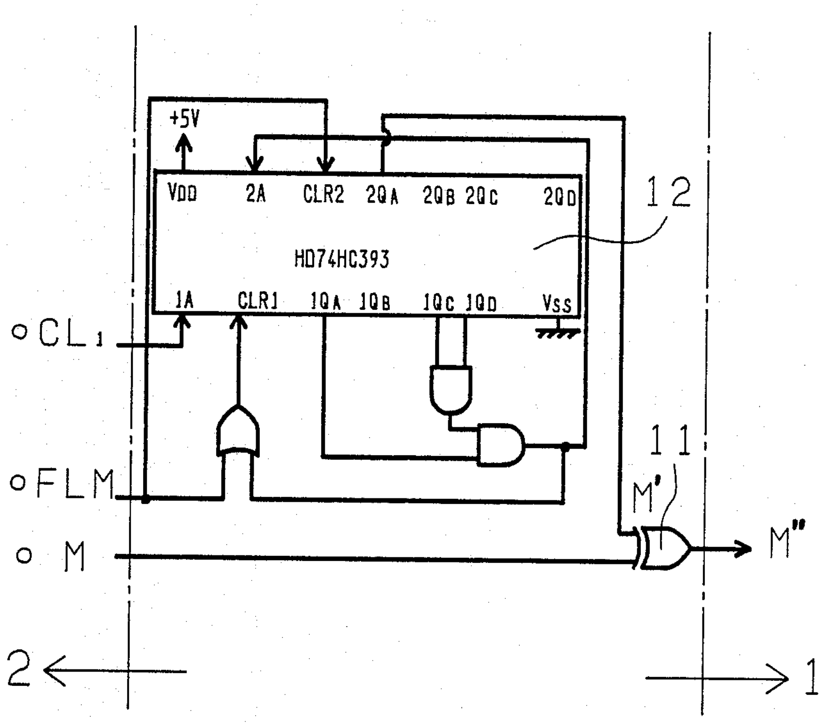

As in the case of the embodiment 3, n=80, $f_F$=70 Hz and m=26. AS can be understood on viewing the circuit shown in the FIG. 18, the still newer control signal M" that synchronizes with the frame signal FLM is similarly generated. This is the same with the embodiment 2.

Embodiment 5

When the time-multiplexing number n is 100 and the frame frequency $f_F$ is 70 Hz, m is computed in the same way as that of the embodiment 1. As a result, there are obtained m=29, 30, 31, 32, 33. However, m=32 is taken up for the purpose of fulfilling Q=4.

Figure 19:
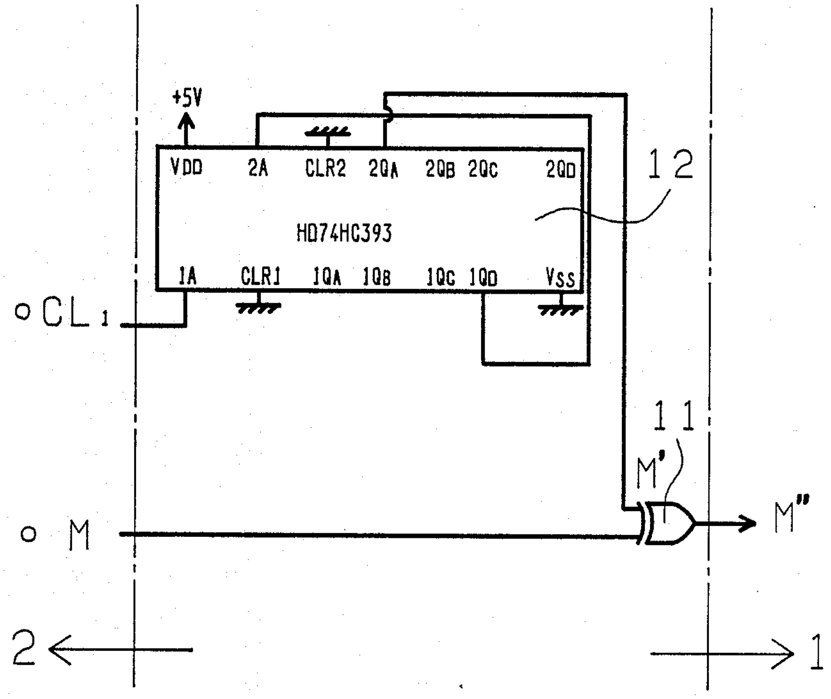

FIG. 19 shows a concrete example of a circuit constituted by the binary counter 12 and the Ex-OR circuit 11. As in the case of the embodiment 1, the control signal M" does not synchronize with the frame signal FLM.

Figure 20:
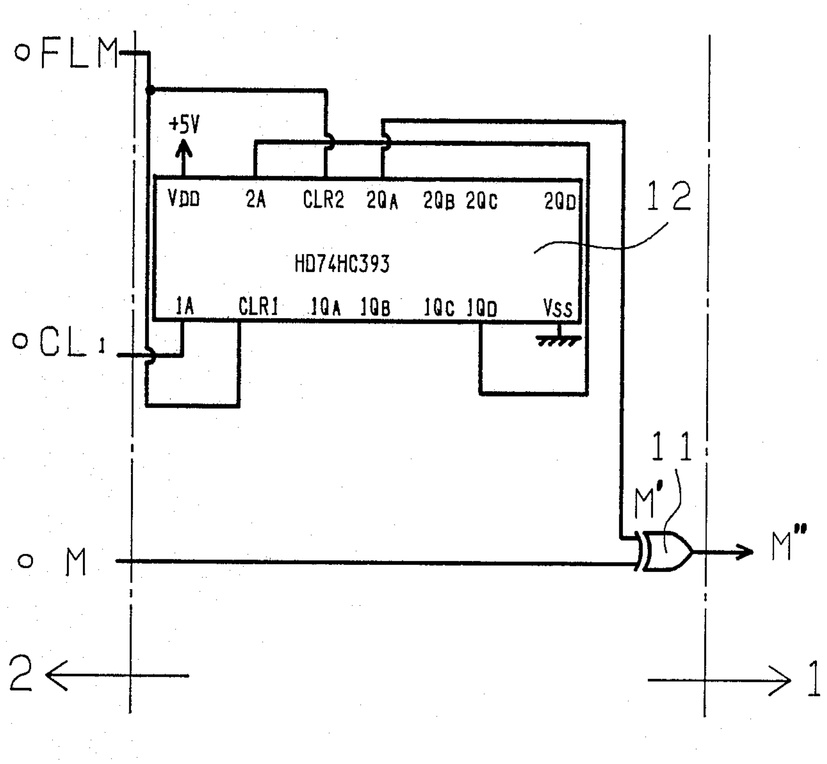

Embodiment 6 n=100, $f_F$=70 Hz and m=32. These values are the same with the embodiment 5. However, as can be clarified by observing the circuit depicted in FIG. 20, the control signal M" that synchronizes with the frame signal FLM is generated. This is the same with the embodiment 2.

Embodiment 7

Figure 21:
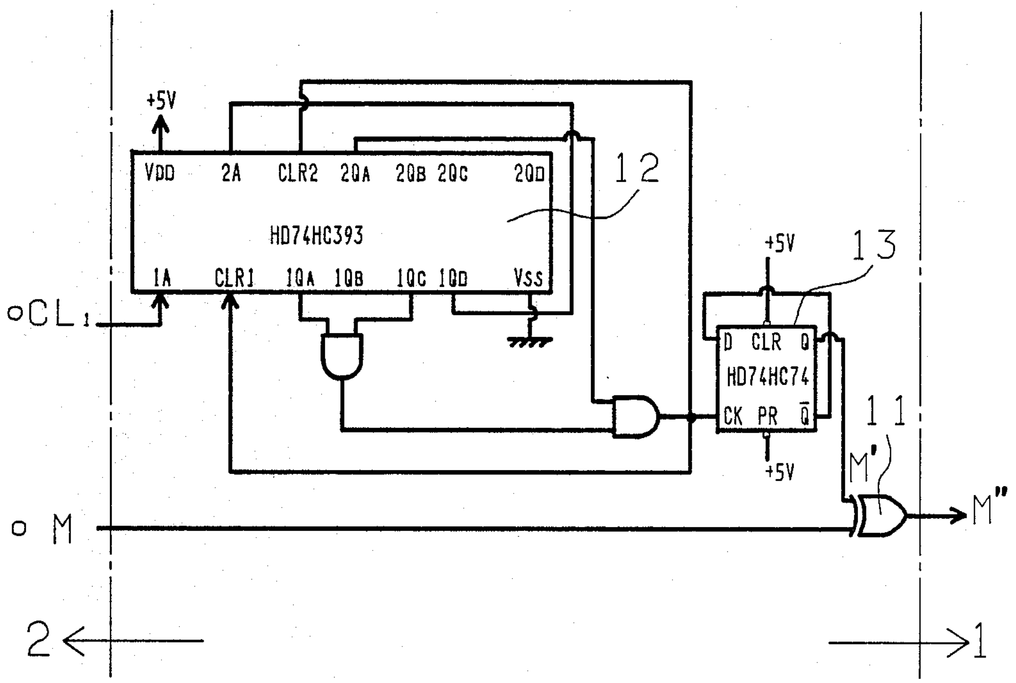

If the time-multiplexing number n is 128 and the frame frequency $f_F$is 70 Hz, m is likewise computed as in the case of the embodiment 1 thereby to obtain m=37, 38, 39, 40, 41, 42. Among these numerical values, m=42 is chosen in order that Q reaches the minimum value, viz., 2. FIG. 21 tangibly shows a circuit which comprises the binary counter 12, a flip-flop 13 and the Ex-OR circuit 11. The flip-flop 13 is herein employed to actualize the control signal M' having 50% duty. The control signal M" does not synchronize with the frame signal FLM, which is the same with the embodiment 1.

Figure 22:
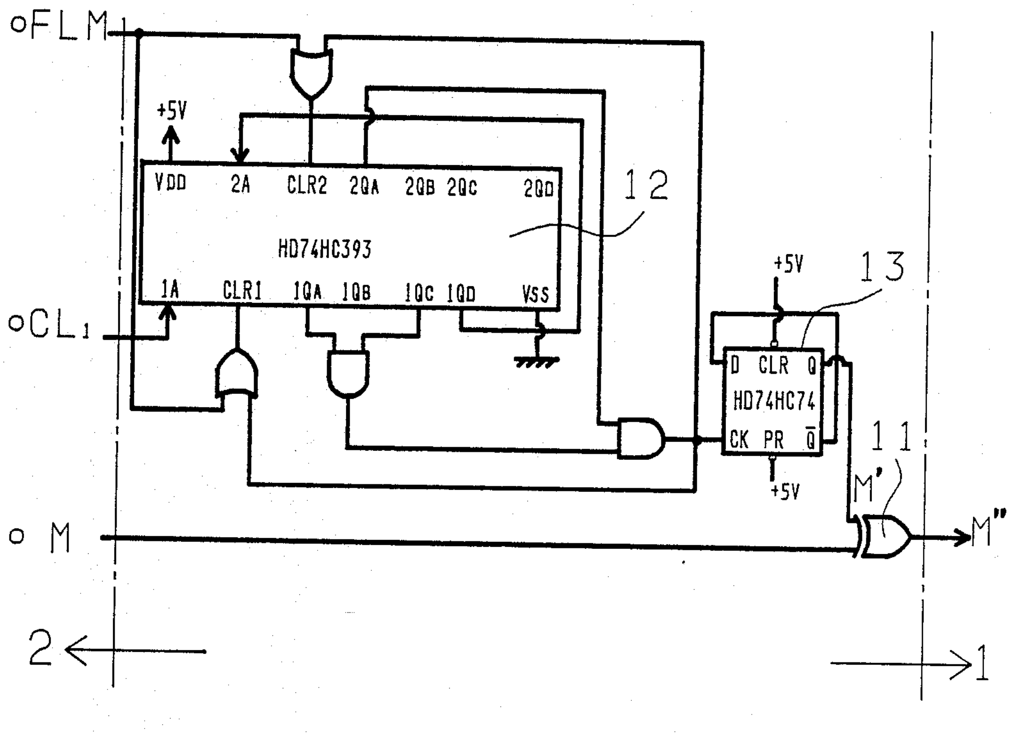

Embodiment 8 n=128, $f_F$=70 Hz and m=42. These values are identical with those of the embodiment 7. As is obvious on viewing a circuit shown in FIG. 22, the control signal M" that synchronizes with the frame signal FLM is generated.

Figure 23:
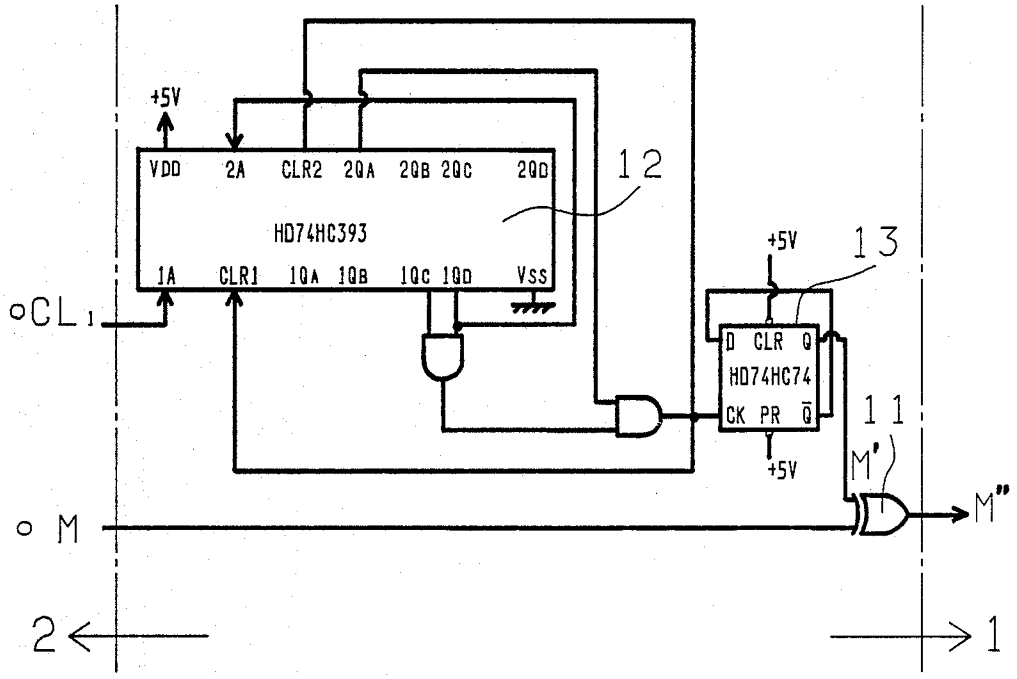

Embodiment 9

Where the time-multiplexing number n is 171 and the frame frequency $f_F$ is 70 Hz, m is similarly computed as in the case of the embodiment 1, thus obtaining m=49, 51, 52, 53, 55, 56. However, m=56 is adopted so that Q comes to its minimum, viz., 3. FIG. 23 tangibly shows a circuit consisting of the binary counter 12, the flip-flop 13 and the Ex-OR circuit 11. The control signal M" does not synchronize with the frame signal FLM. This is the same with the embodiment 1.

Embodiment 10

Figure 24:
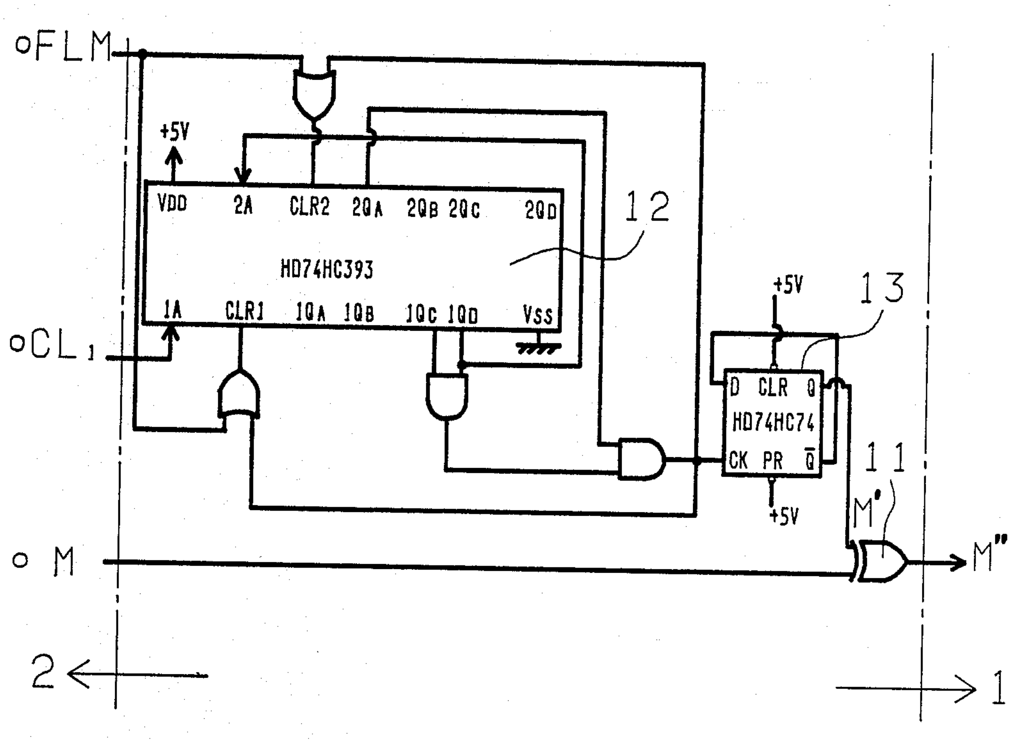

The time-multiplexing n is 171, the frame frequency $f_F$ is 70 Hz and m is 56, which numerical values are the same as those of the embodiment 9. As can be clarified by the observation of a circuit shown in FIG. 24, the control signal M" that synchronizes with the frame signal FLM is generated, this being identical with the embodiment 2.

Embodiment 11

Figure 25:
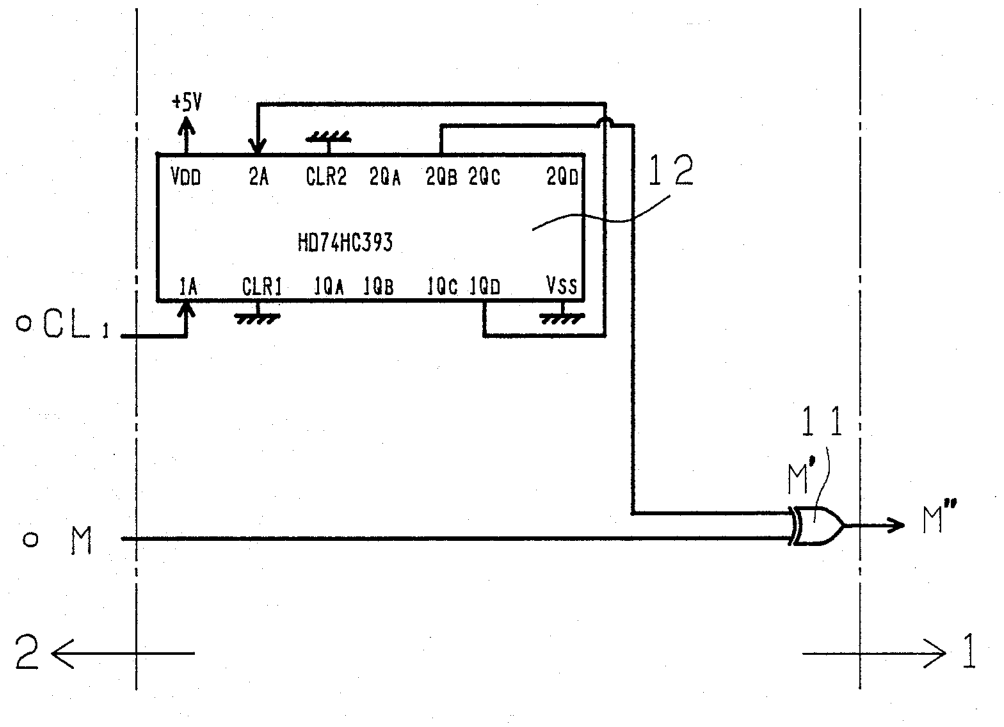

When n=200 and $f_F$=70 Hz, m is likewise computed in the same way as that of the embodiment 1, whereby m=58, 59, 60, 61, 62, 63, 64, 65, 66 are obtained. Of these values is taken up m=64 in which H as well as Q is relatively small. In this case, H=1600 and Q=8. FIG. 25 shows a tangible circuit which is constituted by the binary counter 12 and the Ex-OR circuit 11. The control signal M" does not synchronize with the frame signal FLM. This is the same with the embodiment 1.

Figure 26:
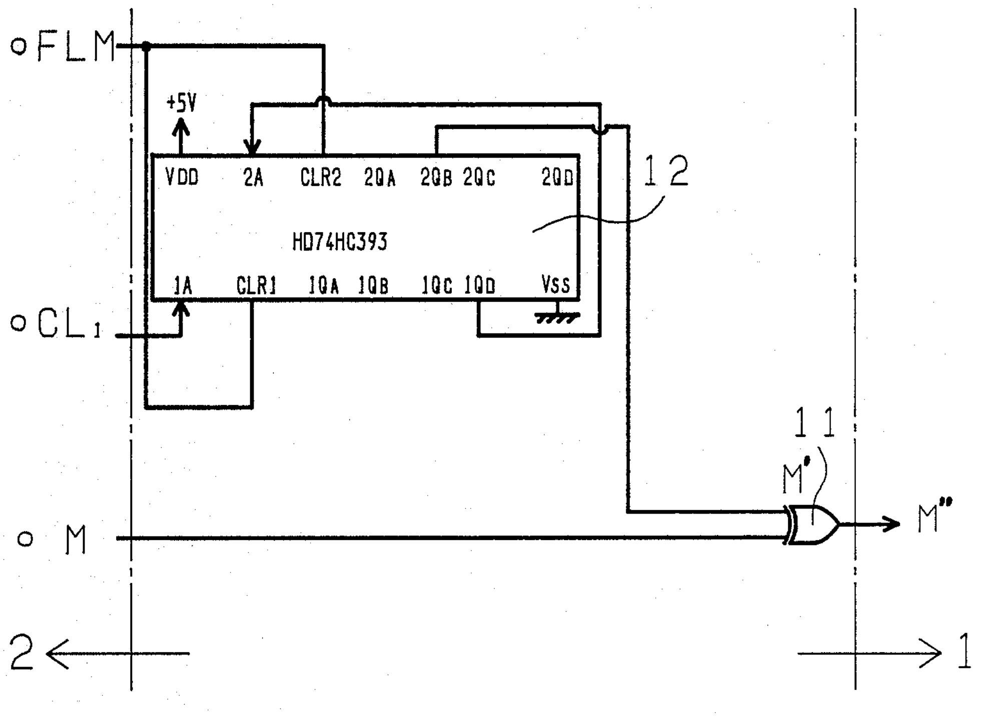

Embodiment 12 n=200, $f_F$=70 Hz and M=64, which are the same as those of the embodiment 11. As is obvious on observing a circuit depicted in FIG. 26, the control signal M'' that synchronizes with the frame signal FLM is generated.

Figure 27:
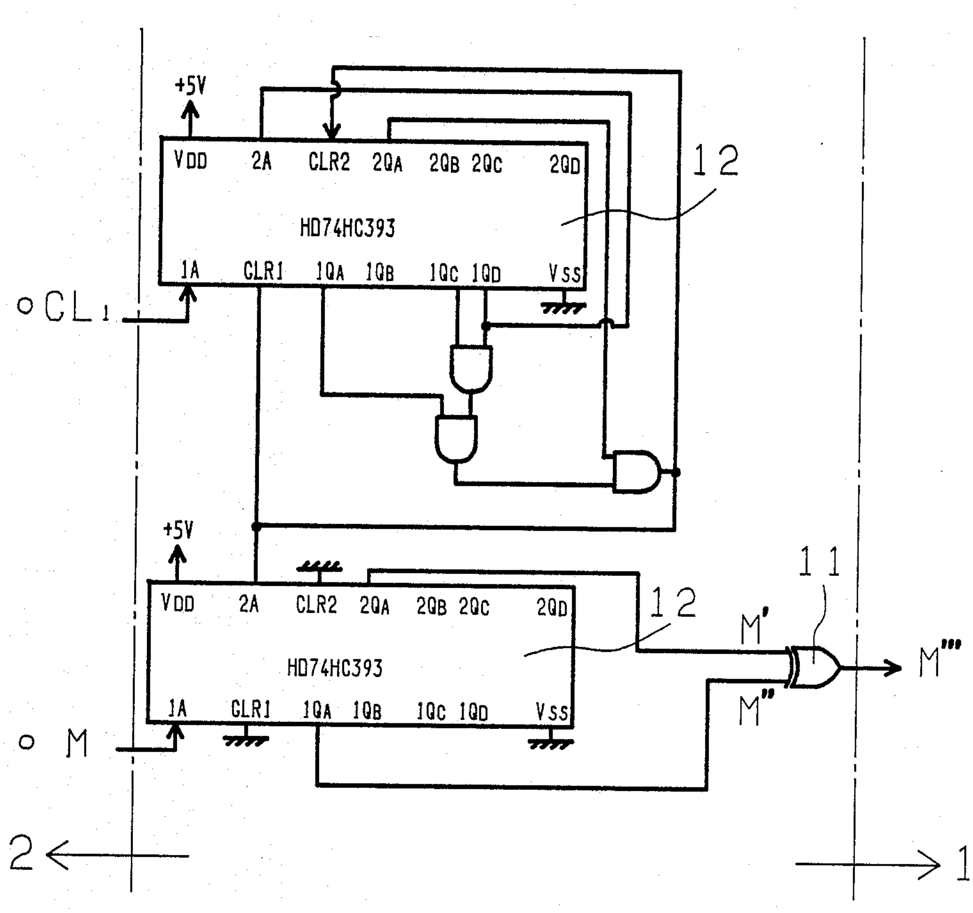

Embodiment 13

Where the time-multiplexing n is 175 and the frame frequency $f_F$ is 70 Hz, FIG. 27 tangibly shows a circuit in which m=58 is chosen. The control signal M'' does not synchronize with the frame signal FLM, which is the same with the embodiment 1.

Figure 28:
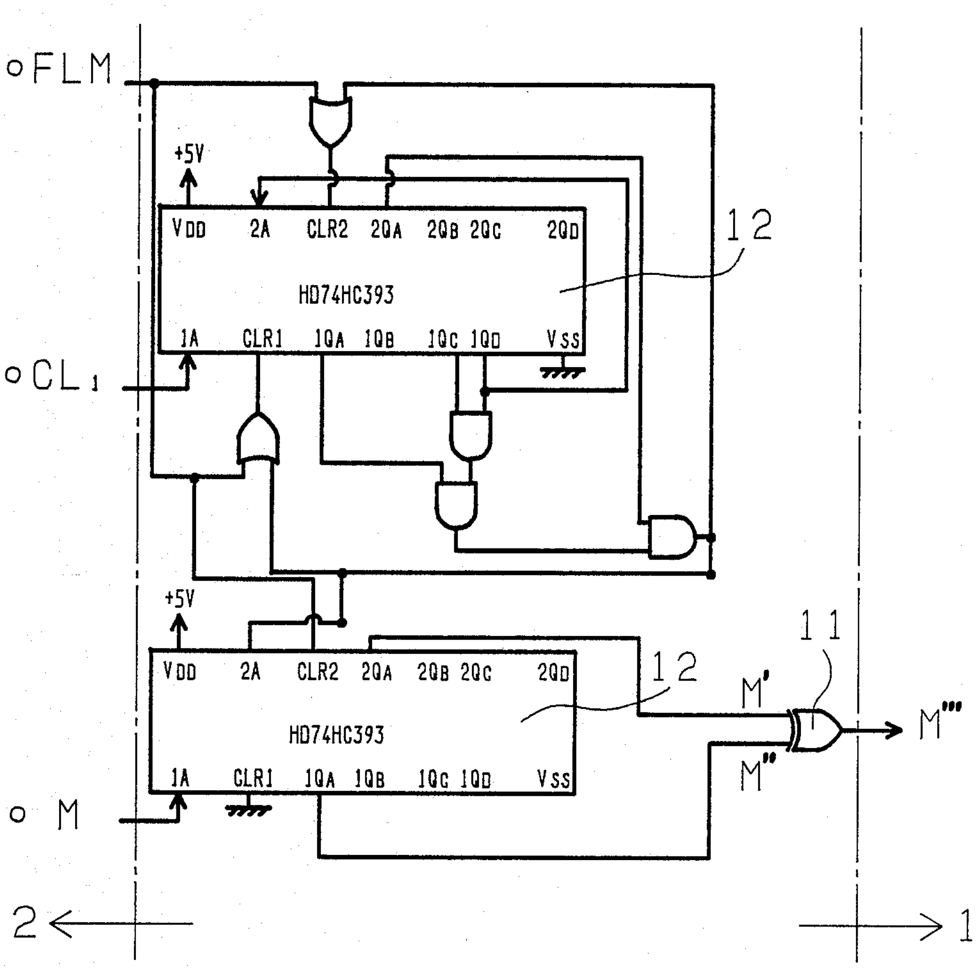

Embodiment 14 n=175, $f_F$=70 Hz and m=58. These numerical values are identical with those of the embodiment 13. As can be understood from FIG. 28, the control signal M'' that synchronizes with the frame signal FLM is generated.

It is to be noted that the latch signal is frequency-divided when generating the signal M' in the above-described embodiments. The present invention is not, however, confined to this.

What is claimed is:

1. A liquid crystal display device comprising:
a liquid crystal module including a liquid crystal display panel having a plurality of liquid crystal picture elements arranged in a matrix form, and driving circuits for applying driving signals to signal electrodes and to scanning electrodes of said liquid crystal display panel, respectively;
a control circuit for controlling operations of said liquid crystal module; and
a means for inverting polarity of a voltage that is to be applied to a liquid crystal layer by generating a control signal M' having a period mτ which signal inverts said polarity of said voltage to be applied to said liquid crystal layer whenever a clock signal having a period τ is counted a predetermined number m/2.
wherein if a period of a frame frequency is nτ and an arbitrary integer is L,
(1) m is set to be 2n/(2L−1), or
(2) m is set to be n/L and said control signal M' is inverted per said frame period nτ, or
(3) m is set to satisfy $L-\frac{1}{2}<n/m<L$, or
(4) m is set to satisfy $L-1<n/m<L-\frac{1}{2}$ and said control signal M' is inverted per said frame period nτ, and furthermore
if the least common multiple of 2n and m be H, values of m are set so that both H/(2n) and H/m are not simultaneously odd numbers.

2. A liquid crystal display device as set forth in claim 1, wherein a period TM' of said control signal M' fulfills the following inequality;

$$2.0 \leq n\tau/\tau M' \leq 6.0.$$

3. A liquid crystal display device as set forth in claim 2, wherein Nτ is not an integral multiple of $\tau_{M'}$.

4. A liquid crystal display device as set forth in claim 1, wherein said control signal M' does not synchronize with said frame frequency.

5. A liquid crystal display device as set forth in claim 4, wherein scanning electrodes where polarity of a voltage to be applied to said liquid crystal elements is inverted differ by less than ten scanning electrodes from frame to frame.

6. A liquid crystal display device as set forth in claim 1, wherein said clock signal is a latch signal for latching information data for display.

7. A liquid crystal display device comprising:
a liquid crystal module including a liquid crystal display panel divided into a plurality of blocks having a plurality of liquid crystal picture elements arranged in a matrix form, and driving circuits for applying driving signals to signal electrodes and to scanning electrodes of said liquid crystal display panel, respectively;
a control circuit for controlling operations of said liquid crystal module; and
a means for inverting polarity of a voltage that is to be applied to a liquid crystal layer by generating a control signal M' having a period mτ which signal inverts said polarity of said voltage to be applied to said liquid crystal layer whenever a clock signal having a period τ is counted a predetermined number m/2,
wherein if a period of a frame frequency is nτ and an arbitrary integer is L,
(1) m is set to be 2n/(2L−1), or
(2) m is set to be n/L and said control signal M' is inverted per said frame period nτ, or
(3) m is set to satisfy $L-\frac{1}{2}<n/m<L$, or (4) m is set to satisfy $L-1<n/m<L-\frac{1}{2}$ and said control signal M' is inverted per said frame period nτ, and furthermore
if the least common multiple of 2n and m be H, values of m are set so that both H/(2n) and H/m are not simultaneously odd numbers.

8. A liquid crystal display device as set forth in claim 7, wherein a period $\tau_{M'}$ of said control signal M' satisfies the following inequality;

$$2.0 \leq n\tau/\tau M' \leq 6.0.$$

9. a liquid crystal display device as set forth in claim 8, wherein nτ is not an integral multiple of $\tau_{M'}$.

10. A liquid crystal display device as set forth in claim 7, wherein said control signal M' does not synchronize with a frame frequency.

11. A liquid crystal display device as set forth in claim 10, wherein scanning electrodes where polarity of a voltage to be applied to said liquid crystal elements is inverted differ by less than ten scanning electrodes from frame to frame.

12. A liquid crystal display device as set forth in claim 7, wherein said clock signal is a latch signal for latching information data for display.

* * * * *